United States Patent
Behandish et al.

(10) Patent No.: US 11,599,099 B2
(45) Date of Patent: *Mar. 7, 2023

(54) SYSTEM AND METHOD FOR CONSTRUCTING PROCESS PLANS FOR HYBRID MANUFACTURING WITH THE AID OF A DIGITAL COMPUTER

(71) Applicant: Palo Alto Research Center Incorporated, Palo Alto, CA (US)

(72) Inventors: Morad Behandish, Mountain View, CA (US); Saigopal Nelaturi, Mountain View, CA (US); Johan Dekleer, Los Altos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 366 days.

This patent is subject to a terminal disclaimer.

(21) Appl. No.: 16/903,073

(22) Filed: Jun. 16, 2020

(65) Prior Publication Data
US 2020/0319628 A1    Oct. 8, 2020

Related U.S. Application Data

(63) Continuation of application No. 15/858,677, filed on Dec. 29, 2017, now Pat. No. 10,719,069.

(51) Int. Cl.
*G05B 19/418* (2006.01)
*B33Y 50/02* (2015.01)
(Continued)

(52) U.S. Cl.
CPC .......... *G05B 19/4188* (2013.01); *B33Y 50/00* (2014.12); *B33Y 50/02* (2014.12);
(Continued)

(58) Field of Classification Search
CPC .......... G05B 19/4188; G05B 19/40938; G05B 2219/31001; G05B 2219/35204;
(Continued)

(56) References Cited

U.S. PATENT DOCUMENTS

| | | | |
|---|---|---|---|
| 5,537,519 A | * | 7/1996 | Vossler ................... G06T 17/10 345/423 |
| 7,084,972 B2 | | 8/2006 | Treado |

(Continued)

OTHER PUBLICATIONS

"Liu et al, Topology optimization for hybrid additive-subtractive manufacturing, Aug. 29, 2016, DOI 10.1007/s00158-016-1565-4" (Year: 2016).*

(Continued)

*Primary Examiner* — Santosh R Poudel
(74) *Attorney, Agent, or Firm* — Mueting Raasch Group

(57) ABSTRACT

A systematic approach to constructing process plans for hybrid manufacturing is provided. The process plans include arbitrary combinations of AM and SM processes. Unlike the suboptimal conventional practice, the sequence of AM and SM modalities is not fixed beforehand. Rather, all potentially viable process plans to fabricate a desired target part from arbitrary alternating sequences of pre-defined AM and SM modalities are explored in a systematic fashion. Once the state space of all process plans has been enumerated in terms of a partially ordered set of states, advanced artificial intelligence (AI) planning techniques are utilized to rapidly explore the state space, eliminate invalid process plans, for instance, process plans that make no physical sense, and optimize among the valid process plans using a cost function, for instance, manufacturing time and material or process costs.

18 Claims, 10 Drawing Sheets

(51) Int. Cl.
*B33Y 50/00* (2015.01)
*G06F 30/17* (2020.01)
*G05B 19/4093* (2006.01)
*B29C 64/386* (2017.01)
*G06F 111/06* (2020.01)
*G06F 119/18* (2020.01)

(52) U.S. Cl.
CPC ............ *G06F 30/17* (2020.01); *B29C 64/386* (2017.08); *G05B 19/40938* (2013.01); *G05B 2219/31001* (2013.01); *G05B 2219/35204* (2013.01); *G05B 2219/49007* (2013.01); *G05B 2219/49023* (2013.01); *G06F 2111/06* (2020.01); *G06F 2119/18* (2020.01)

(58) Field of Classification Search
CPC ........... G05B 2219/49007; G05B 2219/49023; B33Y 50/00; B33Y 50/02; G06F 30/17; G06F 2111/06; G06F 2119/18; B29C 64/386; Y02P 90/02
See application file for complete search history.

(56) References Cited

U.S. PATENT DOCUMENTS

| | | | |
|---|---|---|---|
| 7,236,166 B2 | 6/2007 | Zinniel et al. | |
| 8,903,533 B2 | 12/2014 | Eggers et al. | |
| 9,183,325 B2 | 11/2015 | Wighton et al. | |
| 9,235,658 B2 | 1/2016 | Nelaturi et al. | |
| 9,292,626 B2 | 3/2016 | Nelaturi et al. | |
| 9,524,357 B1 | 12/2016 | Webster | |
| 9,566,679 B2 | 2/2017 | Nelaturi et al. | |
| 9,688,024 B2 | 6/2017 | Stava | |
| 9,792,734 B2 | 10/2017 | Kara et al. | |
| 9,844,917 B2 | 12/2017 | Burhop et al. | |
| 10,035,298 B2 | 7/2018 | Mark | |
| 10,052,812 B2 | 8/2018 | Urbanic | |
| 10,105,897 B2 | 10/2018 | Weitzel et al. | |
| 10,254,746 B2 * | 4/2019 | Chaphalkar | G05B 19/4097 |
| 10,359,764 B1 | 7/2019 | Nelaturi et al. | |
| 10,564,626 B2 | 2/2020 | Nelaturi et al. | |
| 2006/0253214 A1 * | 11/2006 | Gross | G06F 30/00 705/26.1 |
| 2016/0085882 A1 | 3/2016 | Li et al. | |
| 2018/0304361 A1 | 10/2018 | Gibson et al. | |
| 2019/0061269 A1 | 2/2019 | Messner | |
| 2019/0130642 A1 | 5/2019 | Elber et al. | |
| 2019/0204813 A1 | 7/2019 | Behandish et al. | |
| 2019/0351621 A1 | 11/2019 | Nelaturi et al. | |
| 2020/0122403 A1 * | 4/2020 | Dhokia | B29C 64/393 |

OTHER PUBLICATIONS

Behandish et al., "Automated Process Planning for Hybrid Manufacturing", May 18, 2018, 15 pages.
EP Patent Application No. 18212126.9; European Search Report dated Jun. 19, 2019; 15 pages.
Hamilton, "Planning, Preparing and Producing: Walking the Tightrope Between Additive and Subtractive Manufacturing," In Metal AM, vol. 2, Inovar Communications, Ltd., pp. 39-56, 2016.
Nelaturi et al., "Solving Inverse Configuration Space Problems by Adaptive Sampling," Computer-Aided Design 45, 2, pp. 373-382, 2013.
Nelaturi et al., "Automatic Spatial Planning for Machining Operations", 2015 IEEE International Conference on Automation Science and Engineering, Aug. 24-28, 2015, 6 pages.
Nelaturi, "Configuration Modeling," Ph.D. Dissertation, The University of Wisconsin-Madison, 2012.
Shapiro, "Maintenance of Geometric Representations Through Space Decompositions", International Journal of Computational Geometry & Applications, vik. 7, No. 1-2, Apr. 1, 1997, 31 pages.
Sucan et al., "The Open Motion Planning Library," IEEE Robotics & Automation Magazine 19, 4, pp. 72-82, Dec. 2012.
Woo, "Visibility Maps and Spherical Algorithms," Computer-Aided Design 26, 1, pp. 6-16, 1994.
Zhang et al., "Laser Additive Manufacturing Process Planning and Automation", Proceedings of the 10th Annual Solid Freeform Fabrication Symposium, Jan. 1, 2000, pp. 243-250.
File History for U.S. Appl. No. 15/858,520.
File History for U.S. Appl. No. 15/858,677.
File History for U.S. Appl. No. 16/517,450.

* cited by examiner

SYSTEM AND METHOD FOR CONSTRUCTING PROCESS PLANS FOR HYBRID MANUFACTURING WITH THE AID OF A DIGITAL COMPUTER

RELATED APPLICATIONS

This application is a continuation of U.S. Ser. No. 15/858,677, Dec. 29, 2017, which is incorporated herein by reference in its entirety.

STATEMENT REGARDING FEDERALLY SPONSORED RESEARCH AND DEVELOPMENT

This invention was made with Government support under DARPA HR0011-17-2-0030 [New] Fields: fabricating with interoperable engineering, planning, design, and analysis. The Government has certain rights in this invention.

FIELD

This application relates, in general, to hybrid manufacturing processes and, in particular, to a system and method for constructing process plans for hybrid manufacturing with the aid of a digital computer.

BACKGROUND

Additive manufacturing (AM) processes have revolutionized the digital design and manufacturing landscape. Extremely complex structures with customized material gradation, the likes of which heretofore were deemed non-manufacturable using traditional manufacturing techniques, are now possible. AM also permits the manufacturing of more complex and efficient infill structures than would otherwise be impossible. Nevertheless, subtractive manufacturing (SM) remains relevant for producing high-precision mechanical parts. Although AM affords wide freedom in customizing the internal structures of parts, SM can achieve finer precision and surface quality specifications than possible with AM, such as needed for functional interfaces requiring high-tolerance fit and assembly.

Historically, the manufacturing of parts from raw stock or material has involved these two distinct, albeit combinable, manufacturing processes. Fabricating a part through SM involves progressively removing or machining material from raw stock until the part has been reduced to the desired form within a specified tolerance. Raw material is often removed by turning, drilling, or milling. Fabricating a part through AM involves progressively adding or depositing material onto a part being fabricated, often by adding successive layers, until the part approximates an intended shape and size, such as used with three-dimensional printing through fused deposition modeling (FDM). For instance, metal AM is sometimes used in lieu of traditional metalworking, such as casting, but with substantially more freedom in generating complex forms, to produce a near-net shape that is close enough to the final part, although functional interfaces may still need to be finished using SM to satisfy tolerancing and surface quality specifications. In many cases, in layer-by-layer AM processes such as FDM, to allow the upper layers to extend beyond the lower layers' width without sagging due to gravity, additional support materials are printed into the lower layers of the near-net shape, which may require SM post-processing to remove, for instance, in metal AM. One approach to removing support structures from a near-net shape is described in U.S. patent Ser. No. 15/858,520, filed Dec. 29, 2017, now U.S. Pat. No. 10,359,764, the disclosure of which is incorporated by reference.

Process plans that contain unimodal manufacturing sequences of either purely AM or purely SM processes have state transitions that constitute a partial ordering in terms of set inclusion. At each intermediate state of manufacturing, the physical space occupied by the part being fabricated either increases (for AM-only sequences) or decreases (for SM only-sequences) in size, and every later state respectively either includes or is included within the preceding states in the unimodal sequence. The final outcome of the operations that model the monotonic material deposition (AM) or removal (SM) of such sequences is therefore insensitive to permutations, that is, same steps applied in different orders, even though the intermediate states may vary. If the manufacturing primitives are defined as the geometric model of the material deposited (AM) or removed (SM) at a unit manufacturing action with a given manufacturing instrument with certain degrees of freedom (DOF), the total material deposition (AM) or removal (SM) can be evaluated, irrespective of the order of execution of each AM or SM process within the unimodal sequence. Therefore, the manufacturability of the part can be evaluated before proceeding to computationally expensive process planning to find a specific ordered unimodal sequence of AM or SM actions.

Conventionally, unimodal manufacturing sequences have been the default (and only) modality for AM-only or SM-only machine process plans. Recently, hybrid machines equipped with both AM and SM capabilities have emerged, including the Integrex i-400AM, manufactured by Yamazaki Mazak Corporation, Oguchi, Aichi Prefecture, Japan. Such hybrid machines are not restricted to unimodal sequencing of actions and offer the potential to blend arbitrary combinations of AM and SM modalities, where, for instance, an SM operation may be followed by an AM operation followed by an SM operation, and so on. In turn, these arbitrary multimodal sequences can result in increased manufacturing efficiency and further expands the realm of manufacturing possibilities.

Generating process plans for arbitrary multimodal sequences in hybrid manufacturing, though, remains a challenge. The changes in the physical size of a partially-manufactured part while progressing through an arbitrarily-ordered multimodal sequence of AM and SM actions lacks the monotonicity found in unimodal sequences, and the individual AM and SM operations that model the material deposition and subtraction are sensitive to permutations when mixed with each other. As a result, the order of execution of the AM and SM actions matters, and full process planning for any ordered multimodal sequence appears necessary because the constituent AM and SM actions cannot be evaluated out of sequence. This result comes at potentially significant computational expense due to the enormity of the state transition problem space that needs to be explored. Moreover, the manufacturability of the part could not be guaranteed without first completing the process planning.

Therefore, a need exists for an efficient approach to planning nontrivial hybrid multimodal process plans.

SUMMARY

A systematic approach to constructing process plans for hybrid manufacturing is provided. The process plans include arbitrary combinations of AM and SM processes. Unlike the suboptimal conventional practice, the sequence of AM and SM modalities is not fixed beforehand. Rather, all potentially viable process plans to fabricate a desired target part from arbitrary alternating sequences of pre-defined AM and SM modalities are explored in a systematic fashion. Once the state space of all process plans has been enumerated in terms of a partially ordered set of states, advanced artificial intelligence (AI) planning techniques are utilized to rapidly explore the state space, eliminate invalid process plans, for instance, process plans that make no physical sense, and optimize among the valid process plans using a cost function, for instance, manufacturing time and material or process costs.

One embodiment provides a system and method for constructing process plans for hybrid manufacturing with the aid of a digital computer. A computer is provided with a model of a part as-designed to be fabricated that defines, whether explicitly or implicitly, surfaces and the interior of the part. The computer is provided with parameters for a plurality of manufacturing instruments that are each capable of performing at least one of additive manufacturing (AM) and subtractive manufacturing (SM). The computer is provided with manufacturing capabilities for the manufacturing instruments. Each manufacturing capability includes, for a manufacturing operation of one of the manufacturing instruments, motions that characterize the degrees of freedom (DOF) of that manufacturing operation and shapes that characterize the minimum manufacturable neighborhood (MMN) based upon the manufacturing instruments that are available in the manufacturing instrument's toolchain. For each of the manufacturing instruments, the computer computes manufacturing primitives that include the closest shape to the part that is manufacturable through a single manufacturing action that can be performed by the manufacturing instrument based upon the manufacturing capabilities of that manufacturing instrument. 'Canonical intersection terms,' also referred to as 'atomic terms,' 'atomic building blocks,' or simply 'atoms', are computed with the computer by taking the intersections of the manufacturing primitives and the complements for all of the manufacturing primitives. The canonical intersection terms create a partitioning of the manufacturing workspace, referred to as an atomic decomposition, where each atomic building block is a three-dimensional region that is completely inside or completely outside each of the manufacturing primitives. Different subcollections of the collection of canonical intersection terms are formed, explicitly or implicitly, and examined by the computer against the part as-designed. The computer determines whether a union of any subcollection of the canonical intersection terms that is equivalent to the part as-designed can be found. A process plan for manufacturing the part is built with the computer, provided that the union was found. The process plan for manufacturing the part includes a sequence of manufacturing actions that is performable by the manufacturing instruments whose manufacturing primitives were used to compute the canonical intersection terms.

The foregoing approach overcomes the current challenges in combined additive and subtractive manufacturing (AM/SM) by taking advantage of a novel combination of logical reasoning, geometric reasoning, spatial planning, and combinatorial search techniques. The approach decouples the complicated geometric and spatial reasoning aspects of manufacturing from logical reasoning and combinatorial search particulars. This decoupling provides several benefits, including access to a vast array of general-purpose artificial intelligence (AI) planning technologies that need no problem-specific adaptation; flexibility in adjusting geometric decisions by automated algorithms or expert intervention; and separation of manufacturability analysis ("Can the part be built with these actions?") as much as possible from manufacturing planning ("What is the proper order of actions to build the part?").

The exploration of the feasible state space to generate-and-test valid manufacturing process plans does not require an exhaustive search over the entire space of possible combinations of actions, which would lead to combinatorial explosion of complexity and a prohibitively large computational cost. Rather, a narrow subspace of the state space that is guaranteed to produce the desired final form (in terms of the atomic decomposition) is explored by applying logical reasoning to the atomic building blocks.

In addition, the approach provides fast early tests for non-manufacturability before spending computational resources on planning. If the test succeeds, the sequence of hybrid manufacturing actions are obtained by manipulation of logical expressions. On the other hand, if no valid or cost-effective plan can be found for a particular set of manufacturing actions or primitives, the approach systematically explores richer state spaces with finer grained atomic decompositions obtained from more versatile combinations of processes, until a near-optimal solution is found.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
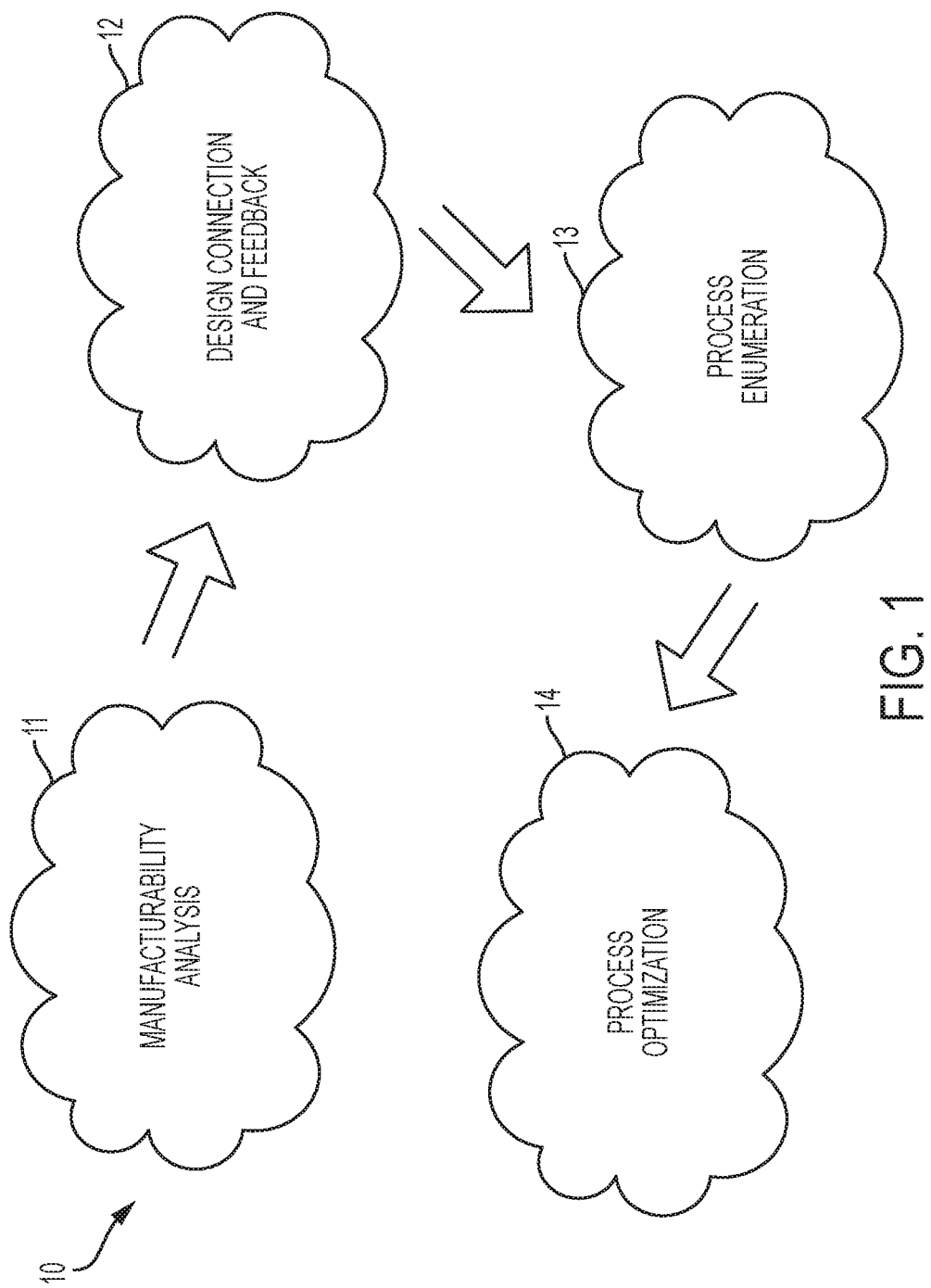
FIG. 1 is a workflow diagram showing manufacturing process planning activities.

The following terminology will be used herein with the meanings indicated, unless noted otherwise:

Manufacturing Capabilities: a formal characterization of a particular type of manufacturing operation of a manufacturing instrument by the degrees of freedom (DOF) and minimum manufacturable neighborhood (MMN). The DOF are defined by the classes of allowable motions of the tool instrument for instance, constrained combinations of rotations and translations, and the MMN models the minimum amount of material that may be deposited (AM) or removed (SM) by the manufacturing instrument. A manufacturing operation might be, for instance, printing, milling, turning, drilling, and so forth. Each manufacturing capability is either additive or subtractive. More precisely, each manufacturing capability is defined by a collection of pairs of motions and shapes for the manufacturing machine's range of performable operations. For each manufacturing operation, the pairs have:

Motions: subsets of the machine's configuration space of valid manufacturing instrument poses (relative to the workpiece) that characterize the DOF of the manufacturing operation, where the configuration space includes geometric transformations that represent the spatial motions of the tool assembly; and Shapes: subsets of the Euclidean space, in which the part being fabricated is embedded, that characterize the MMN based upon the manufacturing instruments, such as geometric models of tool inserts, cutters, mills/drills, printer nozzles, laser beams, wires, saws, welds, and so on, that are available in the manufacturing environment.

A manufacturing environment is called 'unimodal' if the machine only provides one (either AM or SM) modality, for instance, all AM or all SM capabilities, and 'multimodal' if the machine provides both (AM and SM) capabilities. By way of examples, manufacturing capabilities can non-exclusively include turning, milling, and printing in a single machine environment. A range of DOF scenarios are conceivable, for example, the workpiece can be rotated around the turning axis and the machining and printing instruments can be moved radially and longitudinally with respect to the workpiece. The three exemplified capabilities can be formalized as follows:

A manufacturing capability to turn, as defined by:
DOF ("motions"): all valid relative motions between the stock and a lathe cutter, which are composed of a full 360° rotation around the turning axis (with no partial rotations) and all translations along the axis; and
MMN ("shapes"): the geometric shape of the tool inserts that are available in the machine's toolchain (the machine's available manufacturing instruments).

A manufacturing capability to mill, as defined by:
DOF ("motions"): all valid relative motions between the stock and the printer nozzle, which are composed of all rotations (including partial rotations) around the same axis as the turning axis and all translations along the axis and normal to the axis; and
MMN ("shapes"): the geometric shape of the rotating closure of the end-mill and face-mill cutters, for all cutters available in the machine's toolchain.

A manufacturing capability to print, as defined by:
DOF ("motions"): all valid relative motions between the stock and the printer nozzle, which are composed of all rotations (including partial rotations) around the same axis as the turning axis and all translations along the axis and normal to the axis; and
MMN ("shapes"): the geometric shape of the extruded unit of material per layer, whose cross-section is a function of the printer nozzle shape, for all nozzles available in the machine's toolchain.

Other manufacturing capabilities can and do exist with different higher-DOF motions, such as in high-axis turn-mill machining or robotic three-dimensional printing, and their combinations in the same multi-task machine. These manufacturing capabilities can be similarly abstracted in terms of their respective DOF and MMN, and evaluated as discussed below.

Manufacturing Action: the smallest step of a manufacturing process for a fixed process specification selected from a single manufacturing capability. A fixed process specification can be, for instance, tool specifications such as tool shape, tool size, nozzle cross-section, and so forth, setup configuration such as turning axis, fixturing orientation, build orientation, and so on, and other physical specifications such as mechanical, thermal, material specifications. The effect of every manufacturing action is geometrically modeled by sweeping an MMN shape along a particular collection of configurations defined by the DOF of the manufacturing capability that enables that manufacturing action. To discretize the planning space, manufacturing actions are viewed as the quanta of manufacturing processes, which cannot be broken down into smaller processes. For AM/SM manufacturing actions, the swept volume is respectively added to or removed from the pre-existing state of the artifact. This abstraction allows the actions to be viewed as state transitions modeled in terms of Boolean operations between the action's input state and the action's geometric characterization, as defined below.

Manufacturing Primitive: a shape that is achievable through a single manufacturing action of a machine. In particular:

For AM manufacturing actions, the manufacturing primitive is the region of space obtained by sweeping the MMN, for instance, the shape of an extruded unit of material, along a particular motion. The AM manufacturing action is described as a set union operation ("regularized union") with the manufacturing primitive.

For SM manufacturing actions, the manufacturing primitive is the set complement operation ("regularized complement"), that is, the exterior space, of the region of space obtained by sweeping the MMN, for instance, the shape of a tool insert or its rapidly rotating closure, along a particular motion. The SM manufacturing action is described as a set intersection operation ("regularized intersection") with the manufacturing primitive, which is equivalent to a set difference operation with the SM manufacturing action's complement.

Manufacturing Process: a mapping from one intermediate state to another intermediate state of the artifact's shape, as the artifact evolves from the initial state to the final as-manufactured artifact. The initial state will be nothing, that is, an "empty" set, if starting by AM or a raw/bar stock if starting by SM. Every manufacturing process can be composed from one or more manufacturing actions. Thus, a manufacturing action is the smallest possible manufacturing process, while composite manufacturing processes are constructed by a finite sequence of manufacturing actions. Accordingly, every manufacturing process can be described by a finite Boolean formula in terms of the manufacturing primitives, using Boolean, that is, union and intersection, operators. Accordingly:

Manufacturability analysis reduces to deciding whether there exists a "valid" Boolean formula that evaluates to the as-designed part or an as-manufactured target that is sufficiently close to the as-designed target to be equivalent to ("interchangeable with") the as-designed target in terms of semantically-defined tolerance specifications. A part for which no such formula exists is considered to be non-manufacturable. The notion of validity implies that the formula makes physical sense, that is, AM primitives are applied via union (not intersection) and SM primitives are applied via intersection (not union).

Manufacturing process planning reduces to finding one or more such valid formulae that are near-optimal in terms of a given cost function, for instance, manufacturing time and material or process costs.

Manufacturing process planning broadly refers to a set of activities that systematically map digital product design specifications to sequences of manufacturing instructions pertaining to shape, material composition, tolerance specifications, and quality metrics. FIG. 1 is a workflow diagram 10 showing manufacturing process planning activities. The activities non-exclusively include:

Manufacturability Analysis 11: Testing whether a design can be fabricated while preserving its structural (shape or form) integrity using a specific combination of manufacturing capabilities, identifying non-manufacturable aspects, and reasoning about their sources and implications.

Design Correction and Feedback 12: Providing constructive feedback to the designer on the sources of manufacturing failures and potential modifications to the design to improve manufacturability without violating design intent or altering immutable design features.

Process Enumeration 13: Exploring the space of qualitatively distinct process plans. Each process plan is a sequence of manufacturing actions that would ideally lead to the fabrication of the as-designed product or, more practically, of an as-manufactured product that is structurally or functionally interchangeable with the as-designed product.

Process Optimization 14: Ranking the feasible fabrication processes in terms of well-defined cost functions of fabrication, utilization, inspection, and so forth, and selecting one or more near-optimal process plans.

These four activities require careful consideration of geometric, topological, material, and physical aspects of the available manufacturing capabilities and cannot be performed in isolation.

Even with traditional manufacturing, such as machining, process planning remains challenging, particularly when working with tools that offer increasing degrees of freedom (DOF), for instance, high-axis CNC, heterogeneity of processes with different types of DOF, for instance, combined mill-turn, elaborate toolset specification, complex dimensioning and tolerancing schemes, and so forth. Even for the simplest case of three-axis milling, where the manufacturing DOF are restricted to three-dimensional translations (and avoiding complications of three-dimensional rotations), many commercial or industrial solutions approach the four activities in an ad hoc fashion under fairly simplifying assumptions on the tool shape, nominal geometry, and heuristics on the proper selection of a discrete collection of manufacturing primitive actions.

Manufacturability analysis is often approached by spatial reasoning on the accessibility of shape features with a given toolset at different fixturing orientations, using a range of methods from feature recognition and visibility maps to image analysis. Failures in all of these approaches are not uncommon, as feature-based reasoning relies upon numerous arbitrary assumptions on feature semantics and thus fails to capture complex geometric artifacts arising from interplay of intersecting features. Visibility maps tend to oversimplify the reachability of visible (thus presumably accessible) features and neglect the complications arising from arbitrary tool geometries. In contrast, image-based methods enjoy geometric generality at the expense of numerical errors introduced by rasterization and are not easily generalizable to processes with rotational DOF due to the well-known technical difficulties with digitizing rotations and their combinations with translations.

The common challenge to all existing approaches is the proper discretization of the continuum space of manufacturing processes to enable leveraging combinatorial search and planning techniques. Identifying the proper atomic units of manufacturing for a particular combination of capabilities and how to systematically stage the complexity for combinatorial search remains unclear as practiced today. Geometric and spatial reasoning inherently leads to an uncountable planning space, whose exploration complexity is at the mercy of the choice of discretization scheme.

Currently, there is no general methodology or technology to systematically and automatically discretize the planning space for complex manufacturing DOF entailed in high-axis CNC and robotic three-dimensional printing, or allow for heterogeneous and non-monotonic fabrication using combined additive and subtractive capabilities in nontrivial alternating orders. Most existing automatic process planners rely on feature-based heuristics, which come with no guarantees, and do not scale to complex high-axis processes, multiple fixturing configurations, and most importantly, heterogeneous and non-monotonic process combinations. Existing approaches for both additive and subtractive manufacturing methods use clever tricks that take advantage of:

1. the restriction of the process to low DOF, for instance, layered FDM printing, three-axis milling, uniaxial turning, 2.5D EDM/wire cut, and others;
2. homogeneity of the process, that is, either additive or subtractive, but not both; and
3. monotonicity in the evolution of the partially manufactured artifact, for instance, either increasing or decreasing in size, but not both, as the artifact gets closer in shape the as-designed target shape.

As a result, the proper identification of the atomic units of manufacturing is key to decoupling the foregoing four steps of the process planning activity as much as possible, and making planning and optimization tractable.

For example, considering unimodal SM with a three-axis milling machine, the accessibility analysis and the identification of a discrete set of manufacturing actions and their order of application can be decoupled from downstream tool path planning by discretizing the problem into a manufacturing action generation phase in which the algorithms decide a finite set of maximal removable volumes for different available cutters and fixturing orientations, such as described in U.S. Pat. No. 9,292,626, issued Mar. 22, 2016, to Nelaturi et al., U.S. Pat. No. 9,566,697, issued Feb. 14, 2017, to Nelaturi et al., and U.S. Patent application Pub. No. US 2017/0220028, filed Jan. 29, 2016, pending, the disclosures of which are incorporated by reference. The manufacturability test can be performed by testing if the union of all removable regions will eventually cover the entire exterior space of the part, regardless of the particular order of the execution of manufacturing actions. The manufacturability test for such unimodal sequences is decisive, meaning that the part is deemed manufacturable if and only if the part passes this test, irrespective of the order of execution of actions, since the Boolean union operation is insensitive to the order. Process planning becomes warranted only if the part passes the manufacturability test, and process planning then amounts to deciding the most cost-effective ordering of the actions, which can benefit from any number of enumeration and optimization methods as known in the artificial intelligence (AI) subfield of planning. Once high-level planning finds one or more qualitatively distinct near-optimal sequences of actions, each manufacturing action can be further processed for low-level planning, for instance, space-filling path generation and conversion to machine-readable G-code.

Recently, hybrid manufacturing technology has enabled high-axis CNC solutions that provide a range of manufacturing capabilities ranging from traditional machine tool operations, for instance, parallel mill-turn, to advanced metal additive manufacturing, for instance, direct metal laser sintering (DMLS). The precision and dexterity of CNC machines perfected over the last several decades have been combined with the build freedom provided by additive technologies into 'multi-task' machines, for instance, Yamazaki Mazak's INTEGRIX machines, Hybrid Manufacturing Technologies' AMBIT machines, and Matsuura Machinery Corporation's LUMEX machines. The decisive manufacturability test and its separation from process planning as discussed above for the example of unimodal SM has heretofore not been extended to hybrid AM/SM using these multi-task machines. As such, the manufacturing technology is once again striding way ahead of computational design, planning, and optimization.

Figure 2:
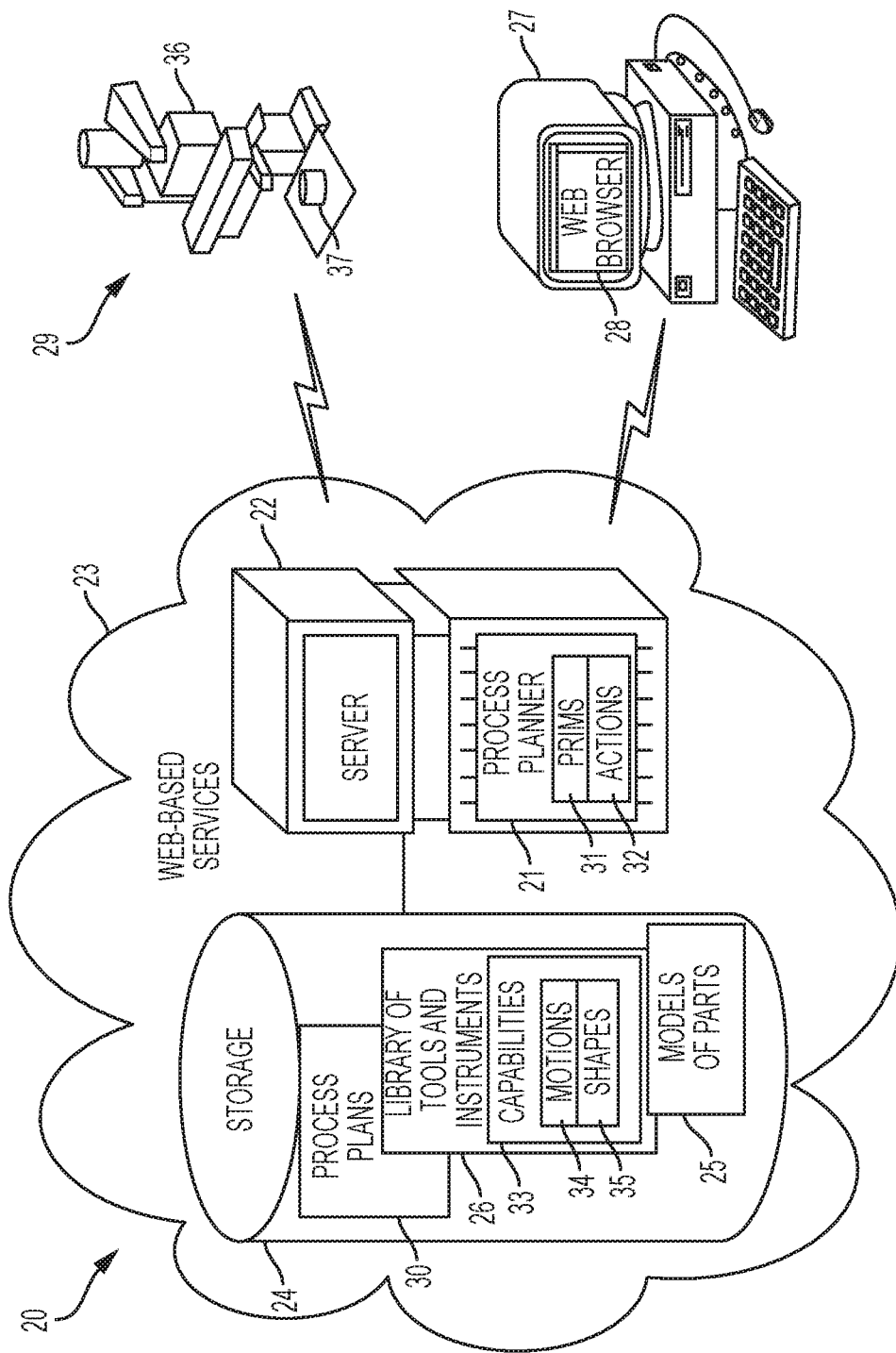
FIG. 2 is a functional block diagram showing a system for constructing process plans for hybrid manufacturing with the aid of a digital computer.

An approach to balance the four activities for hybrid manufacturing process planning, that is, manufacturability analysis, design correction and feedback, process enumeration, and process optimization, as discussed above with reference to FIG. 1, is provided. FIG. 2 is a functional block diagram showing a system 20 for constructing process plans 30 for hybrid manufacturing with the aid of a digital computer. A process planner 21 is provided through a centralized server 22. The server 22 can be remotely accessed via the Web over a wide area public data communications network, such as the Internet, using wired or wireless connections. Users can interface with the server 22 through a Web browser 28 executing on a personal computer 27 or similar device. Alternatively, the process planner 21 can be provided locally on the personal computer 27 or similar device.

The server 22 is operatively coupled to a storage device 24, within which is stored geometric representations or models of parts 25 as designed that define surfaces and the interior of the part, such as represented using explicit or implicit boundary representations or volumetric enumerations, for instance, mesh, voxels, or similar surface or volume units) and a library of AM, SM, and hybrid manufacturing instruments or tools 26, which includes parameters and manufacturing capabilities 33 for each instrument or tool 26. The parameters include positions and orientations along which each instrument either deposits (AM) or removes (SM) material. Each manufacturing capability 33 is a collection of pairs of motions 34 and shapes 35. Both the server 22 and personal computer 27 include components conventionally found in general purpose programmable computing devices, such as a central processing unit, memory, input/output ports, network interfaces, and non-volatile storage, although other components are possible.

In one embodiment, through the process planner 21, the Web-based service 23 generates process plans 30 for hybrid manufacturing. The process planner 21 initially generates a finite collection of geometric sets that include the manufacturing primitives 31 and actions 32. Upon completion, the process planner 21 can generate process plans that are each a hybrid manufacturing sequence that includes multi-task (AM/SM) CNC machining instructions created by modeling the inherent capabilities of a hybrid manufacturing setup 29. The hybrid manufacturing setup 29 includes at least one hybrid manufacturing instrument 36 for performing manufacturing operations. The hybrid manufacturing setup 29 can be programmed with the process instructions in the process plans 30 generated by the process planner 21 and operated to fabricate a part 37. (Note that, unless indicated otherwise, the terms, "part," "product," "target," and "artifact" are used interchangeably herein.)

The process planner 21 implements a novel combination of logical reasoning, geometric reasoning, spatial planning, and combinatorial search techniques that can include a set of spatial planning algorithms for automated manufacturability analysis of arbitrary geometric models, without making simplifying assumptions on the tool geometry and degrees of freedom, or the existence of surrounding tooling and fixtures, such as described in U.S. Pat. No. 9,292,626, issued Mar. 22, 2016, to Nelaturi et al., the disclosure of which is incorporated by reference. The manufacturing setup model corresponds to the library of manufacturing tools and instruments 26 with specifications for each operable tool, and the process planner 21 connects the available manufacturing capability 33 of each tool to the uploaded geometric model of each part 25 to create qualitatively distinct process plans, represented in the form of a JSON ("JavaScript Object Notation") file, Protobuf (Google's "Protocol Buffers") messages, or similar structured encoding or human-readable format, with detailed feedback for each individual process plan.

Figure 3:
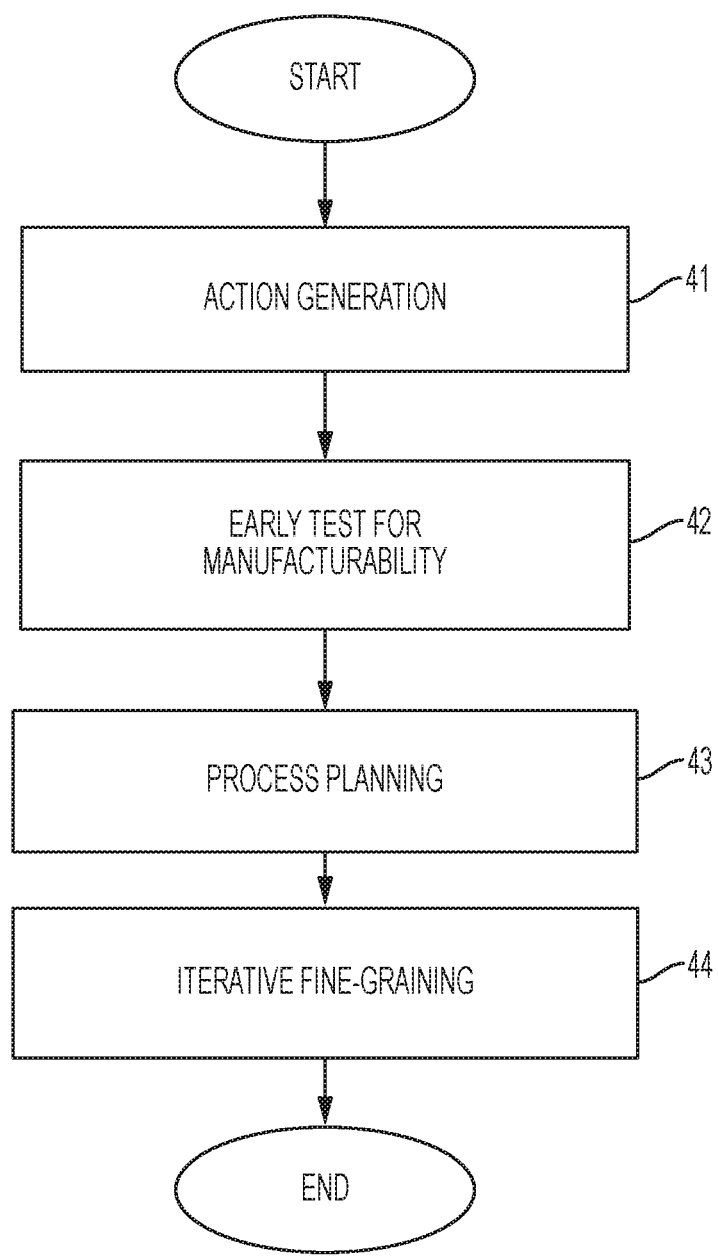
FIG. 3 is a flow diagram showing a method for constructing process plans for hybrid manufacturing with the aid of a digital computer.

The geometric reasoning algorithms use tooling information from the library 26 to allow the process planner 21 to generate process plans for hybrid manufacturing that are not restricted to an a priori fixed sequence of AM and SM modalities, as further described below beginning with reference to FIG. 3. The key to the approach is a systematic and general ability to identify the atomic units of manufacturing for a given collection of available manufacturing capabilities that include both AM and SM processes. Different capabilities, for instance, three-dimensional printing, milling, turning, drilling, and others, have different degrees of freedom (DOF), process-specific constraints, and geometric properties; thus their simulations may demand dramatically different spatial reasoning techniques. Such complexities are abstracted away from process planning by the process planner 21 by defining and computing manufacturing primitives 31 and their canonical intersection terms,' also referred to as 'atomic terms,' 'atomic building blocks,' or simply 'atoms,' one primitive 31 per action in a multi-action process. Process planning is thus reduced to purely logical reasoning on the proper sequence of actions to produce the desired outcome from the atomic building blocks.

The approach to hybrid process planning assumes access to an arbitrary number of additive and subtractive manufacturing (AM/SM) capabilities for a set of manufacturing instruments. For each of the tools, the manufacturing capabilities include the DOFs and MMNs paired for each of the various manufacturing operations that are performable by the manufacturing instrument. FIG. 3 is a functional block diagram showing a method for constructing process plans for hybrid manufacturing with the aid of a digital computer in accordance with one embodiment. The approach is not restricted to an a priori fixed sequence of AM and SM modalities, as are common in most manufacturing workflows; for example, an AM operation typically being followed by an SM operation for post-AM process finishing. Rather, the sequencing of AM and SM operations can be arbitrary, and is left for the planner to optimize. The method is performed as a series of process or method steps performed by, for instance, a general purpose programmed computer, such as the server 22 and personal computer 27, or other programmable computing device.

Hybrid multimodal process planning can be broken down into several steps. During action generation 41, first, a finite collection of geometric models that described manufacturing primitives 31 for either purely AM or purely SM processes are generated. Each manufacturing primitive 31 represents a discrete (AM or SM) action 32 for a particular manufacturing instrument. Consequently, when at least one of the manufacturing primitives 31 is marked purely AM processes and at least one of the manufacturing primitives 31 is marked purely SM processes, a collection of manufacturing actions that collectively contains those two types of primitives and their geometric models can be ordered into an arbitrary multimodal sequence of manufacturing actions, that is, a 'process plan.'

From the planner's perspective, a manufacturing action 32 represents the smallest step of a manufacturing process for a fixed process specification including but not limited to the choice of instrument, orientation, parameters, and so on, selected from a single manufacturing capability 33. Thus, each geometric set characterizes one or more three-dimensional regions that are each made up of (per a manufacturing primitive 31) shapes that collectively represent either all of the material deposited (by an AM process) or all of the material removed (by an SM process) through a single manufacturing action 32 as performed by a tool assembly for a fixed tool specification that has been selected from a single manufacturing capability 33 of the tool assembly.

An important task is to properly define the geometric models of manufacturing primitives for AM/SM actions. Each manufacturing primitive is chosen as the geometric model in the three-dimensional Euclidean space that is closest to target part to be fabricated and is manufacturable by a single capability of a single instrument. A good collection of manufacturing primitives collectively produces an atomic decomposition from which a subcollection of atoms can be found, whose union is equivalent to ("interchangeable with") the as-designed target, or an as-manufactured artifact that is interchangeable, for instance, with respect to semantically-defined tolerance specifications, with the as-designed part. The notion of 'closeness' is defined with respect to geometric, topological, or physical metrics. The closeness metric can be defined in terms of:

- maximally covering as much of the boundary surface of the target as possible, especially the toleranced surfaces that need finishing by a particular SM action;
- maximally covering as much of the interior or exterior volume of the target as possible (depending upon whether the action is additive or subtractive), especially the infill structures that need to be generated by a particular AM action;
- being geometrically as close as possible to the target, for instance, in terms of Hausdorff distance or other metric; or
- having the closest topological characteristics, for instance, number of connected components, holes, and tunnels, to the target as possible.

Other closeness metrics are possible, such as metrics in terms of having the least amount of, or mostly easily removable, support materials for SM, compliance with established knowhow or rules for achieving the best precision or quality, and so on.

For every build/fixture orientation and instrument/tool specification, for most purposes, the following two geometric sets will serve:

- the minimal three-dimensional region that contains the as-designed target or a particular sub- or superset of the as-designed target specified with AM-or
- SM-specific semantics; and
- the maximal three-dimensional region that is contained inside the as-designed target or a particular sub- or superset of the as-designed target specified with AM- or SM-specific semantics.

Both of these two geometric sets can be obtained using concepts from C-space modeling, such as used in the fields of robotics spatial planning and group morphology in multidimensional image analysis. The AM- or SM-specific semantics can refer to surface or interior annotations, such as geometric dimensioning and tolerancing (GD&T) specifications that call for specific SM actions, infill patterns or textures that call for specific AM actions, and so on. Moreover, the primitives can be supplied by manufacturing domain experts using other domain-specific manual or semi-automatic methods.

Once the manufacturing primitives 31 are obtained, the geometric models of canonical intersection terms, that is, 'atoms,' are computed from the collection of geometric models of manufacturing primitives. The canonical intersection terms are found by taking the intersections of the manufacturing primitives and their complements with each other in all possible combinations in the collection of geometric models. The canonical intersection terms constitute the atomic units of manufacturing for a particular combination of manufacturing capabilities 33.

Importantly, once the primitives 31 are populated using geometric algorithms (in most cases), manual input, or a combination of them, the rest of the hybrid process planning approach can be formulated using purely logical reasoning. Thus, the geometric and logical formulations are decoupled, which, in turn, enables standard well-established planning algorithms to be utilized, regardless of the geometric and representational complexity of the as-designed and as-manufactured artifacts or intermediate states.

Here, geometric complexities can be abstracted away from the planning activity formulated in purely logical terms, which provides many practical advantages, including:
- the ability to use general-purpose planners, provided the planners are well-suited to solving the logical statement of the problem;
- the ability to use geometric algorithms to identify a suitable collection of primitives to be replaced to adjust to new requirements, new processes, or new insight; and
- the degree to which the process is automated (implemented in software executing on a computer) versus guided by domain expert human input can be adjusted at the interface between geometric and logical algorithms.

In particular, this advantage encourages a human-machine collaboration in which the human can provide insight into the spatial aspects of manufacturing by choosing or altering the AM/SM primitives 31 generated by machine, while the machine will be largely responsible for exploring the large combinatorial search space through logical reasoning on those primitives 31. Domain experts can override the primitive generation step, add or remove primitives 31 and their corresponding actions 32, that are or are not favorable according to their experience, for instance, discard actions 32 that use obscure build orientations for three-dimensional printing and that require significant support material, or localize the primitives 31 to features that are best addressed by a particular modality, for instance, add AM primitives 31 to create infill structures, and SM primitives 31 to finish functional surfaces.

An early test for manufacturability 42 is performed by using the canonical spatial decomposition, that is, atomic decomposition, of the previous step. The early test for manufacturability evaluates the choice of primitives 31 in the canonical intersection terms based on whether the primitives 31 provide a rich enough space for the as-designed target to be potentially manufacturable. Note that "potentially" implies that the early test will detect non-manufacturability; however, further work will be required before manufacturability can be guaranteed.

The manufacturability test checks if there exists a subcollection of atoms whose union is equivalent to the as-designed target, or an as-manufactured artifact that is interchangeable, for instance, with respect to semantically-defined tolerance specifications, with the target as-designed. Note that a perfect "match" between the subcollection of atoms and the target as-designed may not always be possible, nor necessary, as some degree of imprecision is likely permissible in almost every manufacturing scenario. Thus, an as-manufactured artifact that is within the tolerance specifications of a part as-designed can be considered to be equivalent ("interchangeable") for purposes of manufacturability, and so forth. The atoms that were obtained by intersection of primitives and their complements represent the smallest three-dimensional regions that could be assembled together (in a hypothetical sense) to give the three-dimensional region occupied by the as-designed target. Thus, a necessary condition for manufacturability is that the target itself must be decomposable into a subcollection of atoms, at least up to some permissible manufacturing tolerance that defines interchangeability of as-manufactured models with respect to the as-design model. No atom can be split into smaller pieces, that is, no atom can be partly inside and partly outside of the target; rather, the atom must be either completely inside or completely outside, up to the aforementioned tolerance, for the part to be deemed potentially manufacturable. Otherwise, the information about the split atoms can be used as feedback to define more manufacturing primitives, leading to a finer-grained atomic decomposition that is more likely to cover the target. This iterative 'fine-graining' is repeated until the early manufacturability test passes. The atomic decomposition is rapidly updated upon adding a new manufacturing primitive by intersecting the primitive and its complement with the pre-existing, coarser grained collection of atoms.

Process planning 43 is performed only after the target passes the early test for potential manufacturability, and a subcollection of atoms that can cover the target up to acceptable tolerancing is identified. The region occupied by the Boolean union of this subcollection of atoms yields the geometric model is the as-manufactured part, which is within manufacturing tolerance specifications of the as-designed part, and towards which a process plan is to be identified.

Process planning 43 is the task of finding a valid ordering of the execution of the manufacturing actions that can produce the as-manufactured target. More precisely:
- The atomic, that is, canonical, decomposition and Boolean operations that transform one collection of atoms to another are used to enumerate a discrete combinatorial space for planning.
- The enumeration of valid process plans amounts to finding a valid sequence of AM and SM actions 32 that construct the as-manufactured artifact, which is the subcollection of the atoms found in the previous step. This step amounts to finding a finite valid Boolean formula in the finite Boolean algebra of the canonical decomposition.
- The optimization amounts to finding the most cost-effective valid formula (or several such formulae) and presenting the results to the user as the near-optimal sequence (or sequences) of AM/SM actions 32.
- The validity of the formulae is defined in terms of physical conditions. For example, AM actions cannot be applied in a subtractive fashion, that is, using Boolean intersection, while SM actions cannot be applied in an additive fashion, that is, using Boolean union.
- Other conditions can be applied to further restrict validity, including but not limited to experiment-, simulation-, or rule-based invalidation of certain classes of formulae due to fabrication issues that must be separately accounted for, such as melting, burning, breaking, collapsing, or warping.

For a canonical decomposition that passes the early test for manufacturability, the as-manufactured target that is expressed as the union of a subcollection of atoms gives rise to a disjunctive normal form (DNF) in the finite Boolean algebra of the decomposition.

Here, the process planning can be reformulated as a mapping from this DNF form to Boolean formulae that correspond to meaningful sequences of manufacturing actions. Such formulae are constrained at least by a set of simple conditions, namely:
- each additive and subtractive term appears once and only once, that is, the formula is 'read-once,'
- the AM primitives 31 are added, that is, appear with a union operator, while the SM primitives 31 are subtracted, that is, appear with an intersection operator; and the AM primitives 31 cannot be added to regions of physical space that are already occupied by material introduced in any preceding states, while the SM primitives 31 cannot be subtracted from inaccessible regions, for instance, infill structures.

Other constraints with more complex semantics are possible to ensure that a given Boolean formula makes physical sense and avoids known unfavorable fabrication issues. Once the as-manufactured target is expressed in the canonical form, the corresponding DNF form is mapped into a read-once formula and tested for adherence to the physical conditions listed above.

Iterative fine-graining 44 can be performed to ensure that the early manufacturability test is passed by as few manufacturing primitives, leading to as coarse-grained atoms, as possible. More primitives, leading to finer grained atoms, are only added if necessarily needed. By having developed an algorithm that maps the DNF representation of the as-designed target to read-once Boolean formulae that encodes the valid manufacturing sequences of actions 32, advanced artificial intelligence (AI) planners can be used, such as the A* algorithm and best-first search, to systematically and iteratively refine the decisions made in the previous steps.

In one embodiment, the process planner 21 begins with a small initial set of AM/SM primitives 31 that are either automatically determined (using min/max volumes, as described above) or, in a further embodiment, manually specified by an expert user as a good initial choice. If the early test for manufacturability fails for this set of primitives 31, the process planner 21 increases the granularity of the canonical decomposition by adding primitives 31. For example, if an atom needs to be split to cover the target (partly inside, partly outside), another primitive 31 whose surface provides the split must be added by the process planner 31. The split surface patch is obtained by intersecting the atom with the boundary of the target. The process planner 21 can try different methods to generate primitives 31, including but not limited to the methods described earlier, subject to the additional constraint that the particular surface patch is included on the boundary of the new primitive 31. Once a primitive 31 is found, the primitive 31 and its complement are intersected with all the atoms to see which ones will split, including the particular atom that required splitting, based on which the new primitive 31 was selected, and the issue with covering the part will be resolved. If the process planner 21 cannot find a single primitive 31 that passes through that surface patch, the process planner 21 tries two primitives 31, each partially covering the patch, and so on. Then, the atom would be split into more than two atoms, which may come at an added cost due to the use of more manufacturing actions. In general, primitives 31 are added such that:

Every added primitive 31 is intersected with the previous primitives 31 and their complements to further break the existing (coarser-grained) atoms into smaller (finer-grained) atoms. This process is referred to as 'iterative fine-graining.'

Information from the failed early test for manufacturability is used to inform which atoms need to be broken and thus choose the new primitives 31 effectively until the test passes using the resulting, more fine-grained, atoms.

The iterative fine-graining continues until the decomposition is sufficiently fine grained, meaning that the atoms are small enough such that some subcollection of the atoms (tentatively called the "as-manufactured artifact") can be made interchangeable with the as-designed target. Interchangeability can be determined in terms of the tolerance specifications specified by dimensioning and tolerancing (GD&T) semantics of the as-designed target, but interchangeability could also be defined with respect other structural or functional semantics. Note that the manufacturability of the as-manufactured artifact must still be confirmed by process planning; thence, the as-manufactured artifact is referred to in the tentative sense, pending confirmation of manufacturability.

Illustrative examples demonstrating the concepts described above will now be discussed. For clarity, the examples are depicted in two dimensions to produce planar figures, but the concepts described will be equally valid in three-dimensional space.

Figure 4:
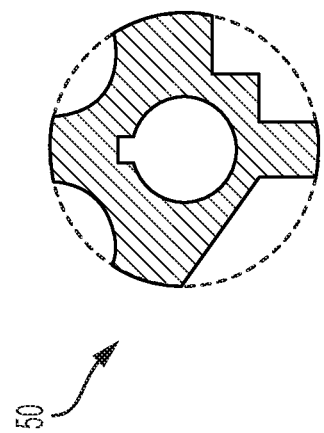
FIG. 4 is a plan view showing, by way of example, a design of a part to be manufactured using purely unimodal SM processes.

First, consider constructing unimodal SM process plans for making a part using combinations of turning, milling, and drilling capabilities. FIG. 4 is a plan view showing, by way of example, a design of a part 50 to be manufactured using purely unimodal SM capabilities, for instance, high-axis mill-turn CNC machines. For a given as-designed target, define six independent manufacturing actions 32 that utilize these capabilities 33. Each manufacturing action 32 is a mapping that takes the initial state, that is, a raw or bar stock or any intermediate state of the workpiece, as an input. As an output, the manufacturing action 32 produces the smallest shape containing a target that is purely manufacturable by a single capability 33 using a single relative part-tool orientation and a single SM tool. The complement of each manufacturing primitive 31, that is, the exterior space to the primitive's occupied volume, will therefore be the maximal removable volume that can be produced using one of the smallest manufacturing steps, in other words, manufacturing actions 31.

In turn, each manufacturing action 32 is a mapping that intersects a given input shape with one manufacturing primitive 31 to obtain an output shape. This step is equivalent to subtracting the complement of the primitive 31 from the input shape. Each composite process, which consists of a finite sequence of arbitrary manufacturing actions 32, is then defined by a finite sequence of intersections. Since Boolean intersections are commutative and associative with each other, the order of applying a finite number of intersections does not matter and the final state will always be the same after executing the same set of six manufacturing actions 32 in any arbitrary order. Thus the part 50 will be manufacturable using some combination of the given set of six manufacturing actions 32 if and only if the intersection of all six manufacturing primitives 31 (in any order) is the same as (or at least interchangeable with) the as-designed target. Note that a similar conclusion will be reached when constructing unimodal AM process plans 30 by replacing intersections with unions since Boolean unions are also commutative and associative with each other, thus the order of applying a finite number of unions does not matter, either. As such, the outcome of any unimodal formula, that is, a formula that has either all union operations or all intersection operations, but not both in the same formula, is invariant under permutations of actions.

The insensitivity of the outcome of unimodal manufacturing processes to the order of execution, whether purely AM or purely SM, has an advantageous implication. The manufacturability test reduces to the evaluation of the as-manufactured artifact from an unordered Boolean formula followed by a rapid test of interchangeability, for instance, in terms of tolerance specifications, against the as-designed target. The manufacturability test is decisive regardless of the order of execution, thus becoming conveniently decoupled from planning. However, the manufacturing cost still depends upon the sequence, and drives the planning.

The monotonicity of the manufacturing processes, meaning that the state transitions are either adding (AM) or removing (SM) to the changing state of the artifact throughout unimodal AM or SM sequences, offers a further significant advantage when looking for sensible heuristics to automatically generate manufacturing primitives 31. For a unimodal AM process, the manufacturing primitives 31 that includes the maximal depositable volume can be selected to get as close as possible in a single step to the as-designed target in the partial order. Likewise, for a unimodal SM process, the complement of the maximal removable volume can be selected to get as close as possible in a single step to the as-designed target in the partial order. This "greedy" heuristic makes sense only in monotonic sequences, in which one desires to close the remaining gap between the workpiece and target as much as possible in a single move. However, the manufacturing primitives 31 need not always be selected, given that a maximal volume heuristic per action may not always represent a globally optimal choice.

Arbitrary hybrid manufacturing processes with alternating AM/SM modalities in arbitrary orders lack the commutativity and monotonicity properties of unimodal all-AM or all-SM processes. The order of execution of constituent additive and subtractive actions 32 matter because union and intersection operations, despite being commutative among themselves, are not commutative with each other. As a result, decoupling manufacturability analysis from manufacturing planning is difficult. Furthermore, the intermediate manufacturing states do not consistently approach the final state of the as-manufactured part by increasing or decreasing in physical size. Rather, the inchoate part might vacillate in size around the target multiple times before converging, such as where materials are added and removed in alternating AM/SM cycles.

Figure 5:
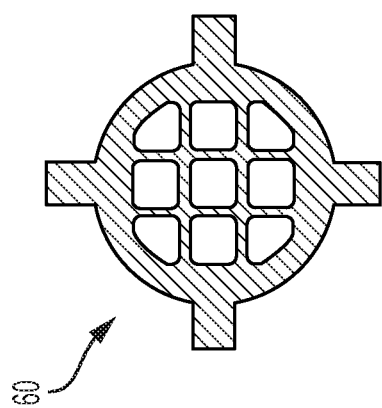
FIG. 5 is a plan view showing, by way of example, a design of a part to be manufactured using hybrid multimodal AM/SM processes.
Figure 6:
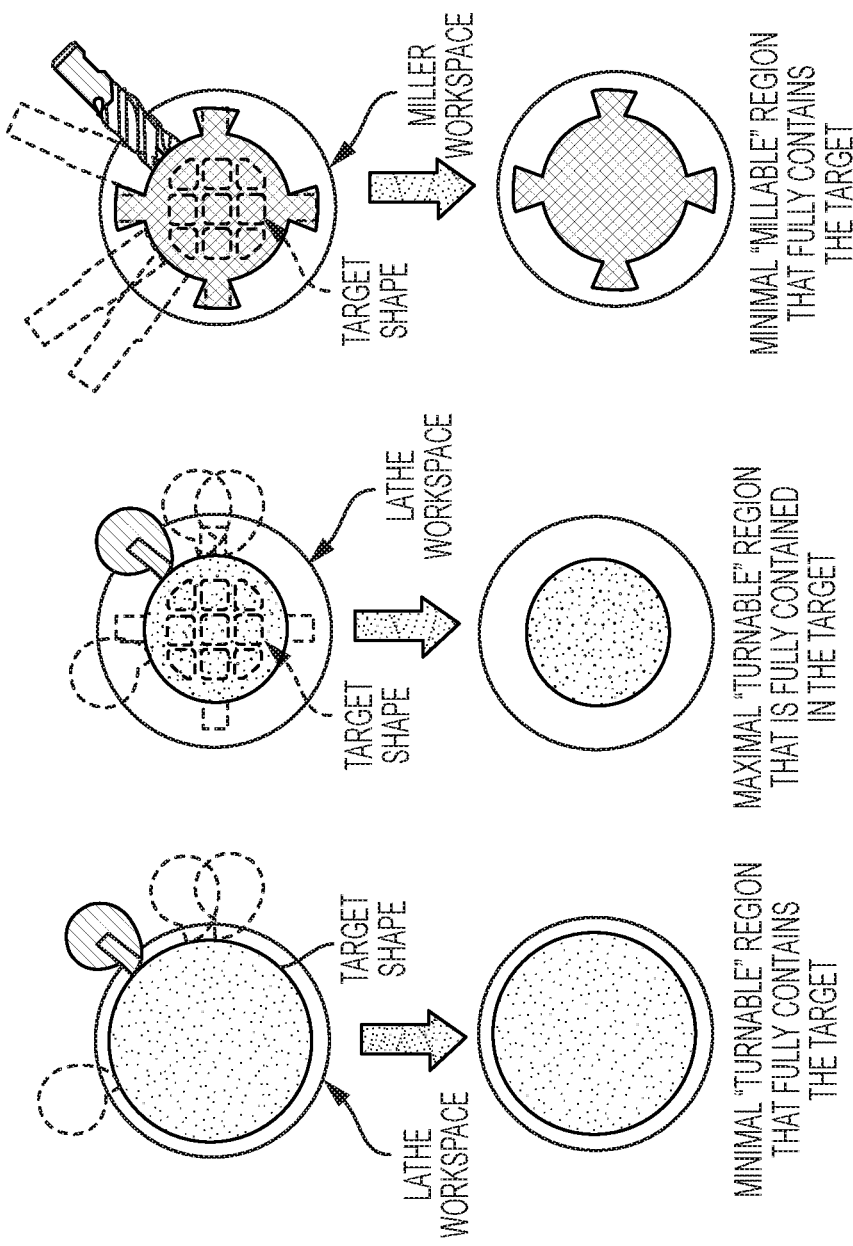
FIG. 6 is a workflow diagram showing, by way of example, manufacturing actions required to fabricate the part of FIG. 5 using hybrid multimodal AM/SM processes.
Figure 7:
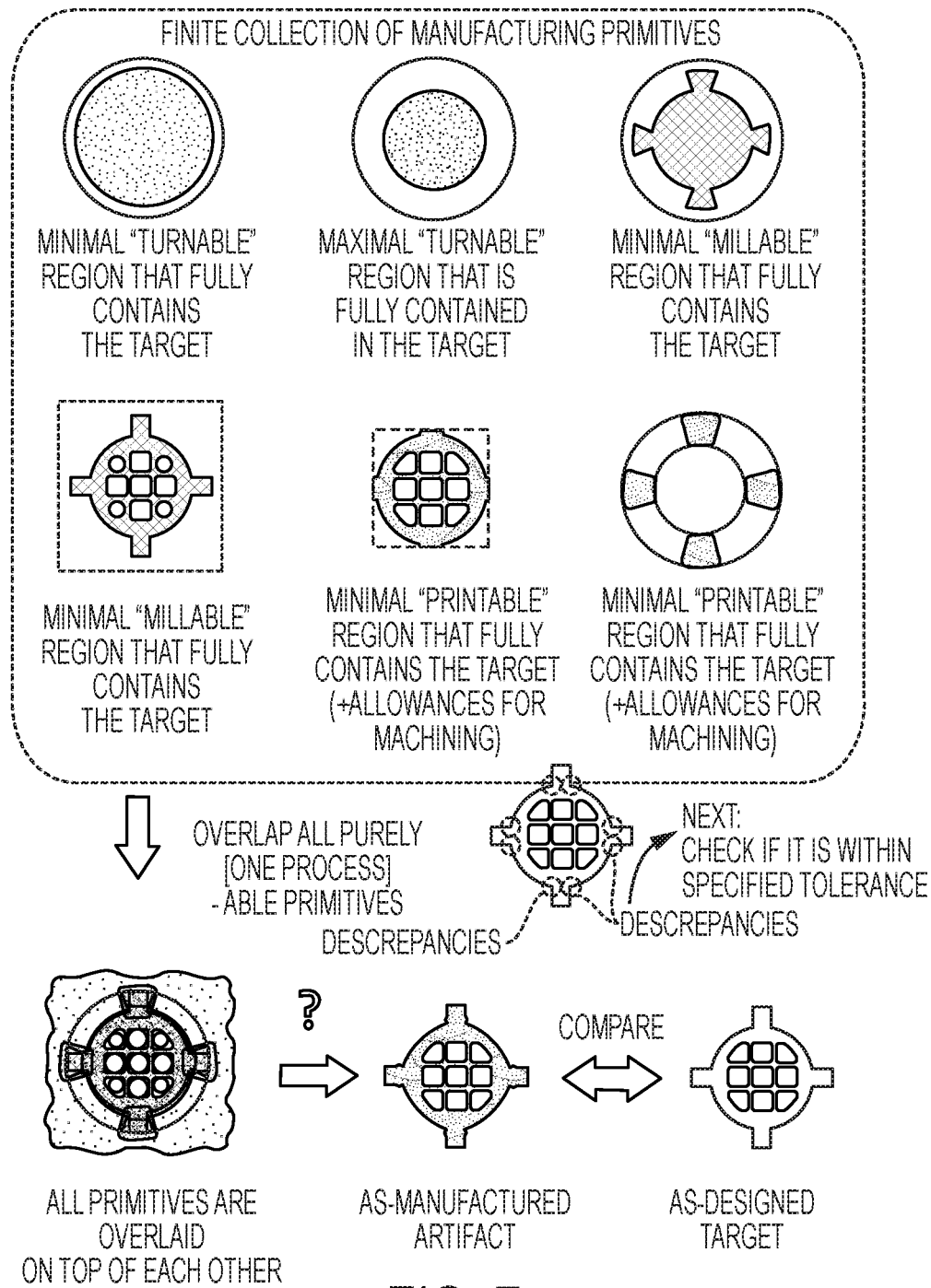
FIG. 7 is a workflow diagram showing, by way of example, the additive and subtractive manufacturing primitives corresponding to the manufacturing actions of FIG. 6.

Next, consider constructing multimodal AM/SM process plans for making a part using combinations of turning, milling, and printing. FIG. 5 is a plan view showing, by way of example, a design of a part 60 to be manufactured using hybrid multimodal AM/SM processes, for instance, high-axis multi-task CNC machines. FIG. 6 is a workflow diagram showing, by way of example, manufacturing actions 32 required to fabricate the part 60 of FIG. 5 using hybrid multimodal AM/SM processes, while FIG. 7 is a workflow diagram showing, by way of example, the additive and subtractive manufacturing primitives 31 corresponding to the manufacturing actions 32 of FIG. 6.

The approach described herein alleviates the analytical deadlock in hybrid multimodal AM/SM processes that can be caused by the lack of the commutativity and monotonicity properties of unimodal all-AM or all-SM processes where the operations necessary to obtain an as-manufactured artifact are order dependent. Nonetheless, every finite Boolean formula, which consists of a finite collection of union and intersection operations applied to a finite number of geometric models, can be expressed in the so-called disjunctive normal form (DNF). The DNF form is composed of disjunctions, that is, unions, in a geometric sense, of a number of subformulae, each of which is conjunctions, that is, intersections, in a geometric sense, of the primitives or their complements. Each subformula evaluates to a so-called canonical intersection term, that is, 'atoms.' The atoms are pairwise mutually disjoint, that is, do not collide with each other, and partition the three-dimensional space into the smallest regions that can be produced by all Boolean formulae on the same primitives. Every outcome of every Boolean formula consists of a subcollection of these atoms. Whether a particular atom ends up inside or outside the resultant of a given Boolean formula depends upon the union and intersect operations and their orders of execution. The atoms can be viewed as the smallest building blocks that are either completely inside or completely outside the outcome of an arbitrary Boolean formula, meaning that an atom cannot be split into two or more pieces by any Boolean formula over a fixed collection of primitives 31.

Although the particular Boolean function that leads to the as-manufactured artifact is not known, an important necessary (but not sufficient) condition for manufacturability is known; namely, that the target must conform to the same atomic decomposition if the target is to be produced within the same Boolean algebra. In other words, the as-manufactured part will be decomposable into a subcollection of the atoms, without splitting any one atom into two or more pieces. Thus, for a given collection of primitives 31, atomic decomposition can be rapidly computed, and, at almost no extra computation cost, whether a subcollection of the atoms whose union is the same as (or interchangeable with) the as-designed target exists can also be determined. If such a union is found, that subcollection immediately yields a DNF for the as-manufactured target, which expresses the target as a disjunction, that is, union, in a geometric sense, the subcollection of atoms, each of which is a conjunction, that is, intersection, in a geometric sense, of the primitives and their complements.

In contrast to unimodal manufacturing processes, there is no guarantee of manufacturability of the part even if the early test for whether a subcollection of the atoms whose union is the same as (or interchangeable with) the as-designed target exists succeeds. False positives are possible because the existence of a Boolean formula does not imply that the formula is physically valid, since the formula may still contain impermissible combinations such as using primitives marked as AM in subtractive fashion, that is, via intersection, or using primitives marked as SM in additive fashion, that is, via union). However, if the test fails, there is a guarantee that no Boolean formula exists, and attempting to find a process plan will be futile. Moreover, the test also provides a systematic mechanism to generate-and-test manufacturing primitives 31 by iterative fine graining of the atoms, and converge to a suitable collection of primitives 31 that is a best fit to a given as-designed target, increasing the odds of finding a valid Boolean formula.

Figure 8:
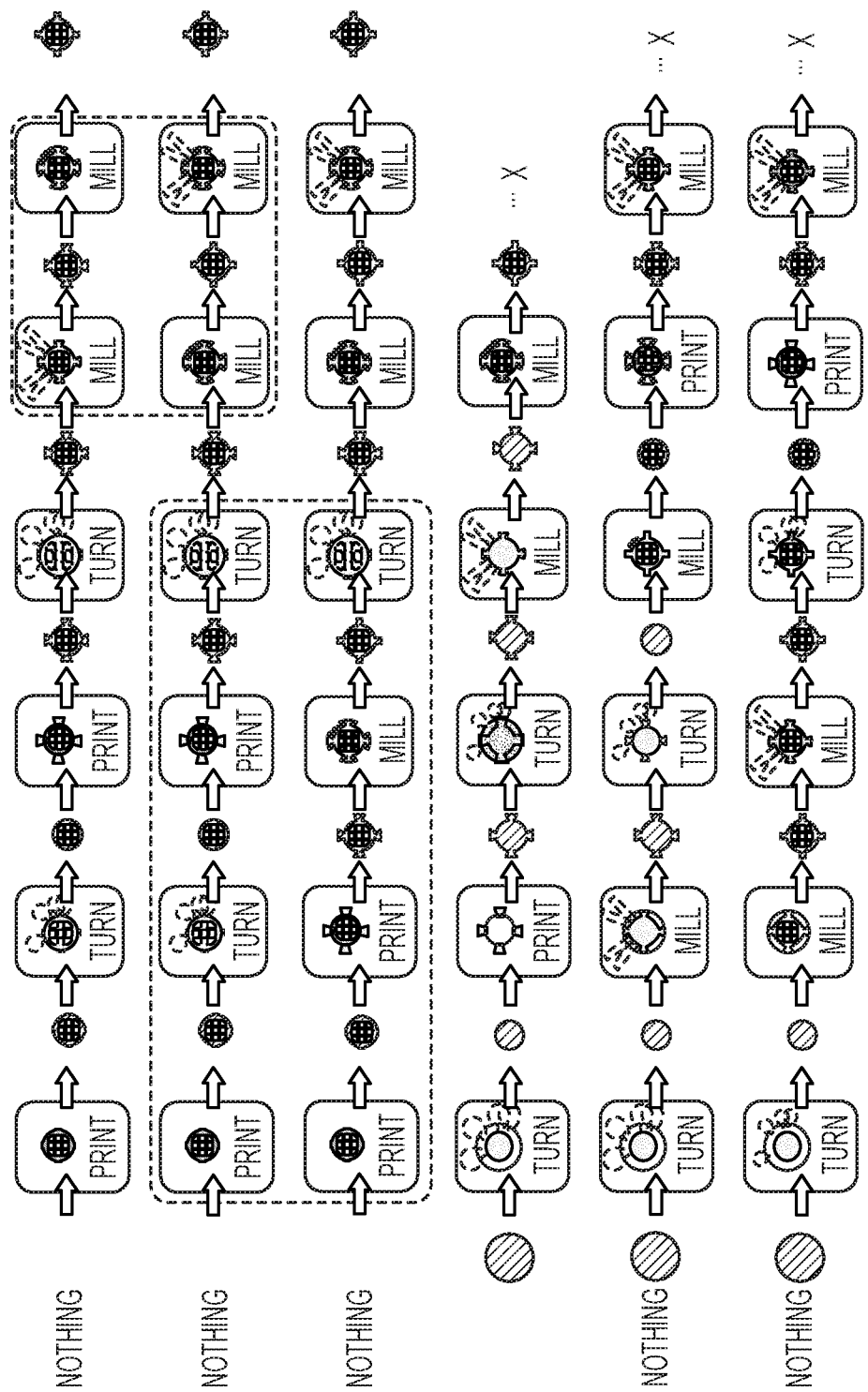
FIG. 8 is a workflow diagram showing, by way of example, a number of hybrid AM/SM process plans that were constructed by alternative permutations of the same set of manufacturing actions to fabricate the part of FIG. 5.

FIG. 8 is a workflow diagram showing, by way of example, a number of hybrid AM/SM process plans that were constructed by alternative permutations of the same set of manufacturing actions to fabricate the part of FIG. 5. The permutations use the same set of manufacturing primitives 31 with union and intersect operators but in different orders. Some, but not all, of the process plans end up at the desired final state.

Figure 9:
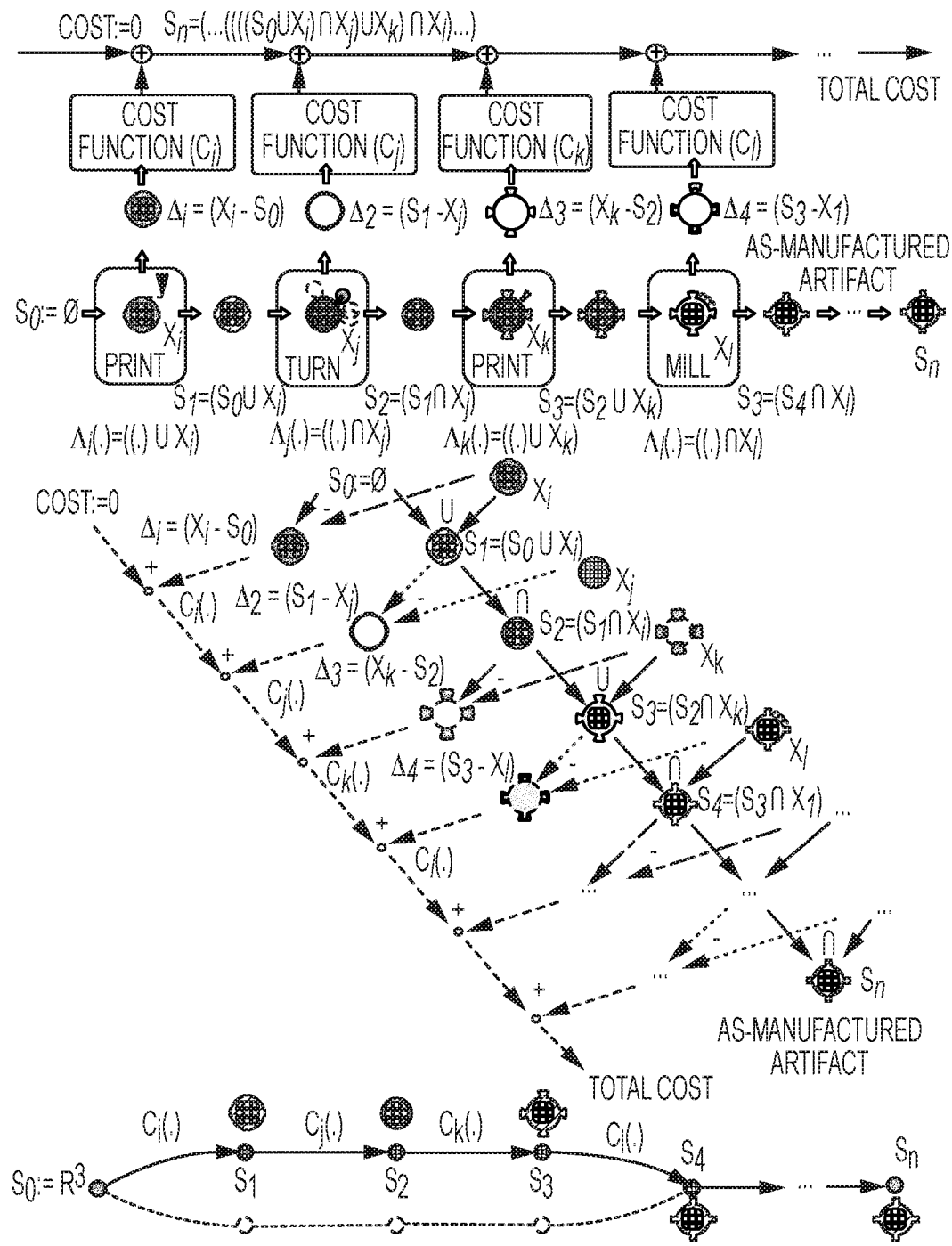
FIGS. 9 and 10 are composite workflow diagrams showing, by way of examples, two different process plans to fabricate the part of FIG. 5.
Figure 10:
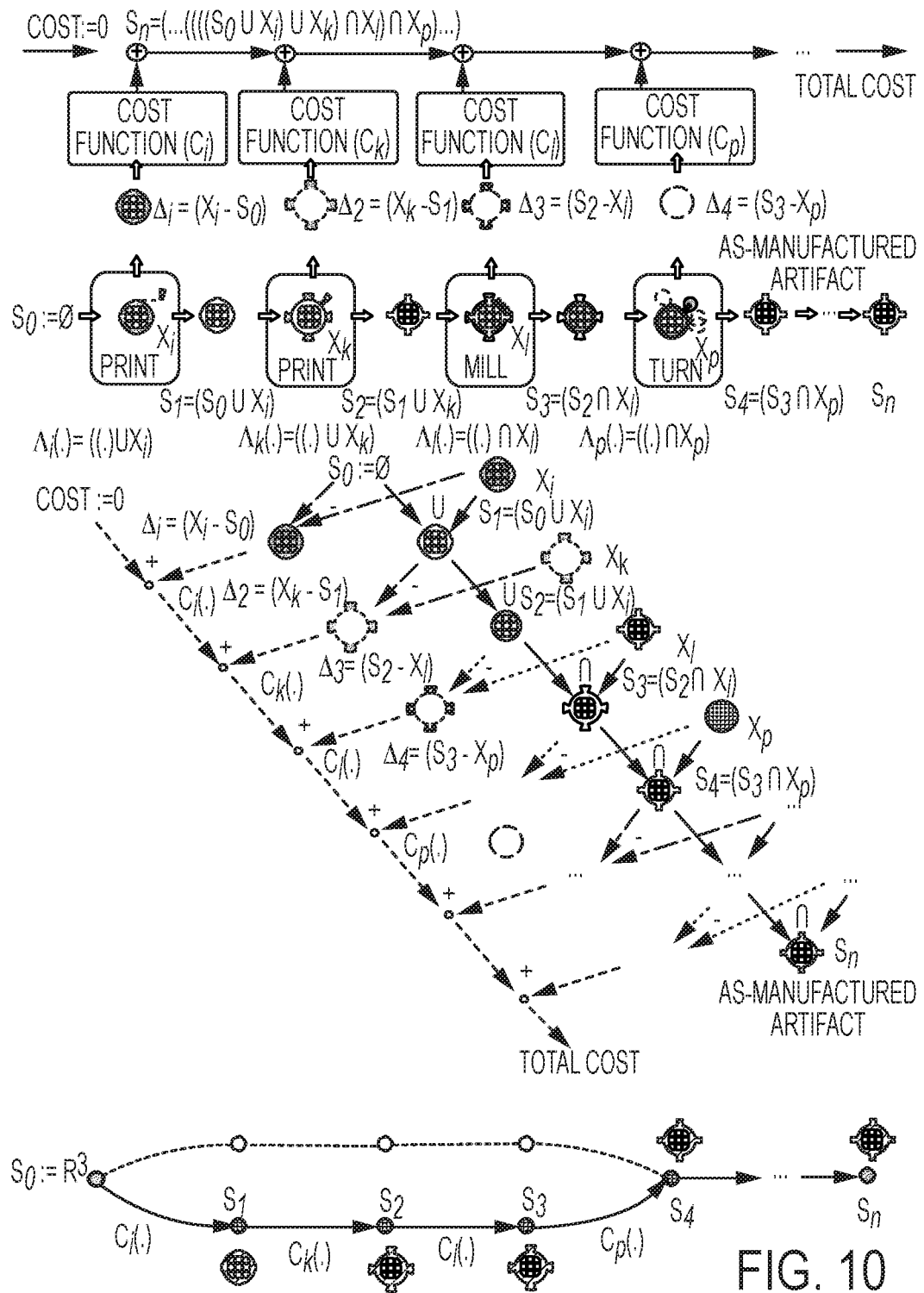
Figure 11:
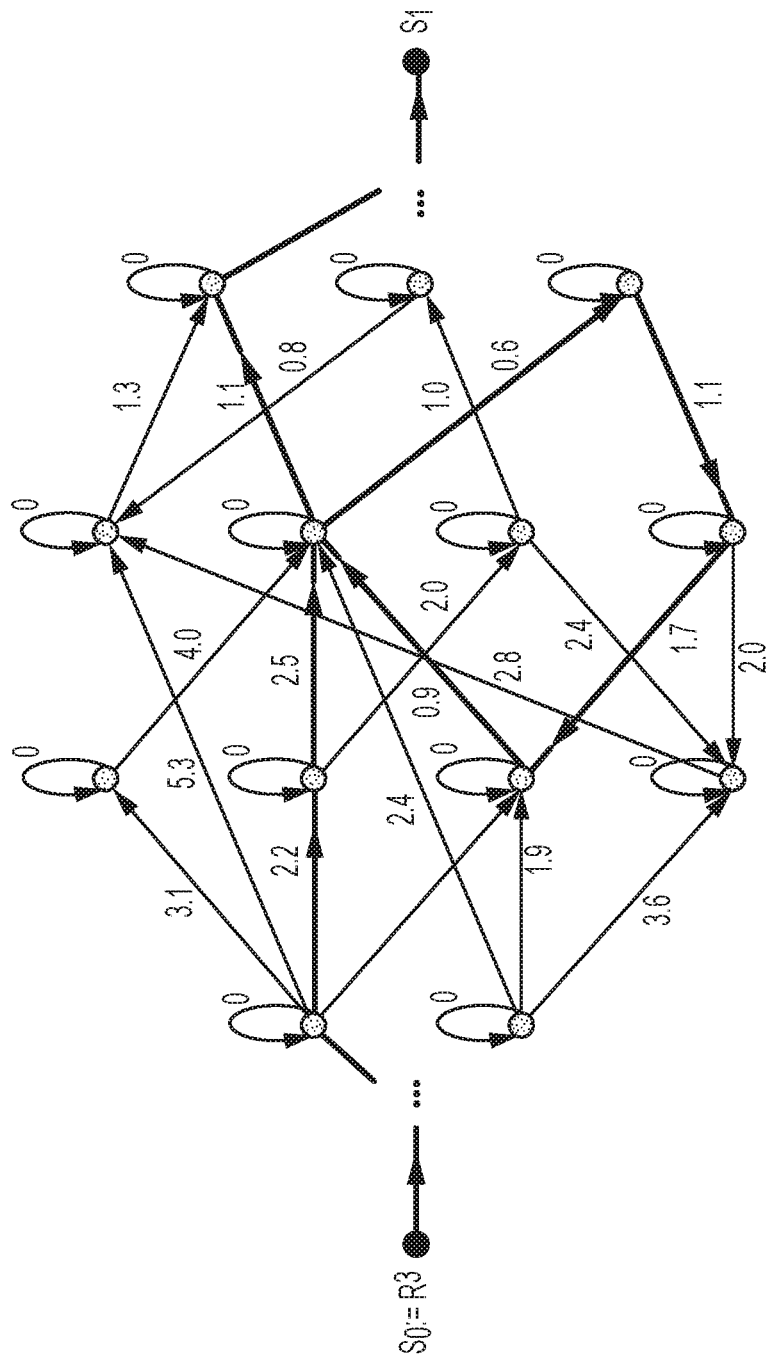
FIG. 11 is a graph showing, by way of example, a directed graph for traversing state transitions for the process plans of FIGS. 9 and 10.

FIGS. 9 and 10 are composite workflow diagrams showing, by way of examples, two different process plans to fabricate the part of FIG. 5, as represented via string diagrams and constructive solid geometry (CSG) trees. The two processes can be represented by a simple directed path whose edges are weighted by the cost of transitioning from one state to another. Both process plans are paths on a large directed graph (DG). FIG. 11 is a graph showing, by way of example, a directed graph for traversing state transitions for the process plans of FIGS. 9 and 10. Unimodal all-AM or all-SM scenarios can be represented with a directed acyclic graph (DAG), as a result of monotonicity; cycles never occur since once material is added or removed from some region in space, there is returning back to a previous state. The only cycles that can occur in a DAG are loops, which are cycles formed from a single edge over one node due to redundant repetition of the same action. However, in general, the DG is not acyclic for combined multimodal AM/SM, since a traversal back to the same state is possible by adding material was previously removed, or removing material was previously added, even though that situation is suboptimal from a cost point of view.

Here, the process planner 21 has to find the shortest path from initial to final states, such that:

The path is acyclic, that is, the path does not include cycles or loops. Cycles are wasteful; every cycle adds a nonnegative cost without changing the state and its elimination reduces the overall cost. For every path with a cycle, there always exists a sub-path that is acyclic and is more cost-effective.

The corresponding Boolean formula is read-once, that is, every manufacturing primitive 31 appears once and only once. Note that this requirement is not the same as the above condition, since there may exist acyclic paths that are not read-once, and read-once formulae that go through the same state twice. The motivation for this condition is that using the same operation twice in the same plan makes no physical sense. Moreover, this condition helps restrict the search space into a more tractable subspace, since read-once formulae are unique for a given end result (up to commutativity of consecutive unions or consecutive intersections).

Importantly, once the early manufacturability test succeeds in finding a subcollection of atoms whose union is the desired target, converting this information into a process plan is straightforward. The subcollection of atoms can be rewritten as a disjunctive normal form (DNF) of the desired target, while valid process plans are a subset of the equivalent read-once formula (or formulae) (up to commutativity of consecutive unions or consecutive intersections). Enumerating the read-once formula (or formulae) for a given DNF is a solved problem in the AI planning literature and can be performed by pure logical reasoning regardless of the geometric form of the atomic building blocks.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for determining manufacturability of a part for hybrid manufacturing, the system comprising:
   a non-transitory, computer readable storage device configured to store:
      a model of an as-designed part;
      parameters for one or more manufacturing instruments available to the system for the hybrid manufacturing of the as-designed part; and
      manufacturing capabilities for the one or more manufacturing instruments;
   a hardware processor coupled to the storage device and to memory, the memory configured to store code for execution by the processor, the processor, memory, and code configured to:
      compute manufacturing primitives for each manufacturing instrument of the one or more manufacturing instruments, each manufacturing primitive comprising a shape that is manufacturable through a single manufacturing action that can be performed by the manufacturing instrument;
      generate a combination of the manufacturing primitives;
      determine atomic regions of a manufacturing workspace encompassing the manufacturing primitives that are influenced consistently by a subcollection of the combination of the manufacturing primitives;
      determine if the subcollection of the manufacturing primitives can bring the atomic regions into existence via additive manufacturing or cause the atomic regions to disappear via subtractive manufacturing; and
      determine that the as-designed part is manufacturable according to a manufacturing sequence described in terms of a combination of the manufacturing primitives, wherein the manufacturing sequence comprises only additive manufacturing primitives, only subtractive manufacturing primitives, or a combination of the additive manufacturing primitives and the subtractive manufacturing primitives; and
      form a process plan for manufacturing the part, the process plan including a sequence of manufacturing actions that is performable by the one or more manufacturing instruments according to the manufacturing sequence, the process plan used to manufacture the part via the one or more manufacturing instruments.

2. The system of claim 1, wherein the processor, memory, and code are configured to:
   compute canonical intersection terms by taking intersections and complements of the manufacturing primitives, each canonical intersection term defining a three-dimensional region that is completely inside or completely outside each of the manufacturing primitives; and
   form one or more different subcollections of the canonical intersection terms that comprise a representation of an as-manufactured artifact that is interchangeable with the as-designed part in view of semantically-defined tolerance specifications.

3. The system of claim 2, wherein:
   the storage device is configured to store semantics for interchangeability of an as-manufactured part; and
   the processor, memory, and code are configured to determine whether there exists a union of a subcollection of the canonical intersection terms that matches the as-designed part with respect to the semantics for interchangeability.

4. The system of claim 3, wherein the semantics for interchangeability comprise geometrical dimensioning and tolerancing semantics.

5. The system of claim 3, wherein the processor, memory, and code are configured to:
   if no union was found, extract further canonical intersection terms by taking the intersections of the manufacturing primitives with at least one additional manufacturing primitive and the complements for all of the manufacturing primitives, and forming one or more sub collections of the further canonical intersection terms; and
   reattempt to determine whether the union of at least one of the subcollections of the further canonical intersection terms matches the as-designed part with respect to the semantics for interchangeability.

6. The system of claim 5, wherein the processor, memory, and code are configured to:

determine whether one of the canonical intersection terms needs to be split to match the as-designed part; and select an additional manufacturing primitive whose surface provides the split.

7. The system of claim 5, wherein the processor, memory, and code are configured to determine non-manufacturability of the as-designed part if no matching union of the further canonical intersection terms can be found.

8. The system of claim 1, wherein the processor, memory, and code are configured to operate the manufacturing instruments according to the sequence of manufacturing actions in the process plan.

9. The system of claim 1, wherein the process plan comprises an arbitrarily-ordered, multimodal sequence of additive and subtractive manufacturing actions that can be performed by the manufacturing instruments.

10. A computer-implemented system for determining manufacturability of a part for hybrid manufacturing, the system comprising:

a non-transitory computer readable storage device configured to store:
 a model of an as-designed part;
 parameters for one or more manufacturing instruments available to the system for the hybrid manufacturing of the as-designed part; and
 manufacturing capabilities for the one or more manufacturing instruments;

a hardware processor coupled to the storage device and to memory, the memory configured to store code for execution by the processor, the processor, memory, and code configured to:
 compute manufacturing primitives for each manufacturing instrument of the one or more manufacturing instruments, each manufacturing primitive comprising a shape that is manufacturable through a single manufacturing action that can be performed by the manufacturing instrument;
 determine whether atomic regions of a manufacturing workspace encompassing the manufacturing primitives can be refined into smaller regions to make a non-manufacturable as-designed part manufacturable;
 determine properties of a new manufacturing primitive needed to satisfy the refinement;
 determine that the as-designed part is manufacturable according to a manufacturing sequence described in terms of a combination of the manufacturing primitives, wherein the manufacturing sequence comprises only additive manufacturing primitives, only subtractive manufacturing primitives, or a combination of the additive manufacturing primitives and the subtractive manufacturing primitives; and
 form a process plan for manufacturing the part, the process plan includes a sequence of manufacturing actions that is performable by the manufacturing instruments according to the manufacturing sequence, the process plan used to manufacture the part via the one or more manufacturing instruments.

11. A computer-implemented method for determining manufacturability of a part for hybrid manufacturing, the method comprising:

providing a processor with a model of an as-designed part to be fabricated by the hybrid manufacturing;

providing the processor with parameters for one or more manufacturing instruments that are each capable of performing at least one manufacturing process;

providing the processor with manufacturing capabilities for the one or more manufacturing instruments;

computing, by the processor, manufacturing primitives for each manufacturing instrument of the one or more manufacturing instruments, each manufacturing primitive comprising a shape that is manufacturable through a single manufacturing action that can be performed by the manufacturing instrument;

providing the processor with semantics for interchangeability of an as-manufactured part;

determining, by the processor, whether there exists a union of a subcollection of canonical intersection terms that matches the as-designed part with respect to the semantics for interchangeability, each canonical intersection term defining a three-dimensional region that is completely inside or completely outside each of the manufacturing primitives; and determining, by the processor, that the as-designed part is manufacturable according to any manufacturing sequence described in terms of a combination of the manufacturing primitives, wherein the manufacturing sequence comprises only additive manufacturing primitives, only subtractive manufacturing primitives, or a combination of the additive manufacturing primitives and the subtractive manufacturing primitives; and forming a process plan for manufacturing the part, the process plan including a sequence of manufacturing actions that is performable by the manufacturing instruments according to the manufacturing sequence, the process plan used to manufacture the part via the one or more manufacturing instruments.

12. The method of claim 11, wherein determining, by the processor, that the as-designed part is manufacturable comprises:

computing the canonical intersection terms by taking intersections and complements of the manufacturing primitives; and forming one or more different subcollections of the canonical intersection terms that comprise a representation of an as-manufactured artifact that is interchangeable with the as-designed part in view of semantically-defined tolerance specifications.

13. The method of claim 11, comprising:

if no union was found, extracting further canonical intersection terms by taking the intersections of the manufacturing primitives with at least one additional manufacturing primitive and complements for all of the manufacturing primitives, and forming one or more subcollections of the further canonical intersection terms; and reattempting to determine whether the union of at least one of the subcollections of the further canonical intersection terms matches the as-designed part with respect to the semantics for interchangeability.

14. The method of claim 13, comprising determining non-manufacturability of the as-designed part by the processor if no matching union of the further canonical intersection terms can be found.

15. The method of claim 11, wherein computing the manufacturing primitives by the processor comprises at least one of:

choosing with the processor a first geometric representation that maximally covers a boundary surface of the as-designed part;

choosing with the processor a second geometric representation that maximally covers one of an interior or exterior volume of the as-designed part;

choosing with the processor a third geometric representation that comprises a geometrically closest representation of the part as-designed; and choosing with the processor a fourth geometric representation that comprises a closest topological characteristics to the as-designed part.

16. The method of claim 11, comprising:

specifying with the processor a first geometric representation as a minimal three-dimensional region that comprises a first region that contains the as-designed part with respect to one of additive manufacturing-specific and subtractive manufacturing-specific semantics; and specifying with the processor a second geometric representation as a maximal three-dimensional region that comprises a second region that is contained inside the as-designed part with respect to one of the additive manufacturing-specific and the subtractive manufacturing-specific semantics.

17. The method of claim 11, comprising operating the manufacturing instruments according to the manufacturing sequence in the process plan.

18. The method of claim 11, wherein the process plan comprises an arbitrarily-ordered, multimodal sequence of additive and subtractive manufacturing actions that can be performed by the manufacturing instruments.

* * * * *